United States Patent
Baruschke et al.

(10) Patent No.: US 6,185,950 B1
(45) Date of Patent: Feb. 13, 2001

(54) SENSOR FOR DETECTING SOLAR INSOLATION

(75) Inventors: Wilhelm Baruschke, Wangen; Oliver Kaefer, Murr; Karl Lochmahr, Vaihingen/Enz, all of (DE)

(73) Assignee: Behr GmbH & Co., Stuttgart (DE)

( * ) Notice: Under 35 U.S.C. 154(b), the term of this patent shall be extended for 0 days.

(21) Appl. No.: 09/204,560

(22) Filed: Dec. 4, 1998

(30) Foreign Application Priority Data

Dec. 5, 1997 (DE) ................................................ 197 53 884

(51) Int. Cl.$^7$ ................................ G05D 23/00; G01J 5/00
(52) U.S. Cl. ..................... 62/244; 236/91 C; 250/338.1; 256/213
(58) Field of Search ................ 374/32, 121; 250/388.1; 256/213; 236/91 C; 62/244

(56) References Cited

U.S. PATENT DOCUMENTS

| | | | |
|---|---|---|---|
| 4,491,727 | * 1/1985 | Applebaum et al. | 123/573 X |
| 4,702,618 | * 10/1987 | Maund | 374/121 |
| 5,281,818 | 1/1994 | Tomita et al. | 250/347 |
| 5,951,375 | * 9/1999 | West | 236/91 C |

FOREIGN PATENT DOCUMENTS

| | | |
|---|---|---|
| 38 21 743 A1 | 1/1990 | (DE) . |
| 40 41 770 C1 | 7/1992 | (DE) . |
| 41 09 399 C2 | 6/1995 | (DE) . |
| 195 17 517 A1 | 11/1995 | (DE) . |
| 195 43 508 C1 | 10/1996 | (DE) . |
| 0136812 * | 5/1989 | (JP) .................................. 236/91 C |

* cited by examiner

Primary Examiner—William Wayner
(74) Attorney, Agent, or Firm—Foley & Lardner

(57) ABSTRACT

The invention relates to a sensor for detecting the direction and intensity of solar insolation, particularly, for controlling an air conditioning system, having at least two sensor elements that, are assigned to the left-hand and right-hand sides of the vehicle, respectively, and are arranged on a respective face whose surfaces are, at least partially, subject to the solar insolation entering the vehicle from the left-hand and right-hand sides, respectively. To provide an improved sensor that is particularly cost effective and can be fitted simply into a vehicle to control an air conditioning system, the sensor elements are designed as temperature sensors and are each connected in a heat conducting manner to their associated surfaces, which surfaces absorb, at least, most of the solar insolation which is incident thereon.

19 Claims, 3 Drawing Sheets

SENSOR FOR DETECTING SOLAR INSOLATION

BACKGROUND OF THE INVENTION

1. Field of the Invention

The invention relates to a sensor for detecting the direction and intensity of solar insolation, particularly, for controlling an air conditioning system.

2. Description of Related Art

Sensors of this type, for detecting the solar insolation in a motor vehicle interior, are used to control an air conditioning system to compensate for increased temperature in the vehicle interior resulting form the incoming solar insolation. To control precisely the temperature of the vehicle interior with the aid of the air conditioning system, the heating up of the passenger compartment due to the action of the solar insolation has to be determined with the aid of the sensor. Since the sensor elements detect the incident light radiation in different directions, the air conditioning system can be fed a corresponding, individual measurement signal to control the temperature in the vehicle interior differently at certain locations. It is thus possible to obtain different air conditions in the vehicle interior matched to the individual vehicle occupants'desires, for example, one condition on the driver side and another on the front-passenger side and/or on the front seats versus the rear seats.

A sensor similar to this type is disclosed in DE 38 21 743, in which a sensor has two photodiodes, one being assigned to each of the left-hand and right-hand sides of the vehicle, respectively. The photodiodes also are arranged on a face of the sensor whose surfaces can be subjected to the solar insolation coming in from the left-hand and right-hand sides of the vehicle, respectively. The direction of the solar insolation, therefore, can be determined.

Moreover, a temperature sensor is provided in the center between the two photodiodes. The temperature sensor is constantly subjected to the solar insolation because of its central arrangement or location. As a result, the incident heat can be detected and a variation in the temperature of the photodiodes can be compensated for. A disadvantage of this known sensor is that it is relatively complex and complicated and is therefore not cost effective. The evaluation of the photodiode signals is relatively complex. Moreover, photodiodes age and a permanent load due to solar insolation has a negative effect.

SUMMARY OF THE INVENTION

One object of the present invention is therefore to provide an improved sensor for detecting the direction and intensity of solar insolation in a vehicle.

A further object of the invention resides in providing such a sensor that overcomes the aforementioned disadvantages.

It is a further object of the invention to provide a sensor that is cost effective and can be placed simply in a vehicle for controlling an air conditioning system.

Yet another object of the invention is to provide an improved vehicle instrument panel/dashboard or other surface embodying the sensor according to the invention, as well as a vehicle containing such a surface.

In accomplishing these and other objects, there has been provided according to one aspect of the invention, a device for detecting the direction and intensity of solar insolation incident upon the interior of the vehicle, comprising: a sensor having at least a right-hand and a left-hand surface, wherein each of said surfaces is subject to solar insolation and absorbs most of the solar insolation incident thereon from the right-hand and left-hand sides of the vehicle; and two temperature sensor elements, said sensor elements being assigned one to said left-hand surface and one to said right-hand surface and being connected in a heat conducting manner to the respective surfaces of said sensor.

In accordance with another aspect of the invention there has been provided a surface in a motor vehicle having a device for detecting the direction and intensity of solar insolation incident upon the interior of the vehicle, wherein the device comprises a sensor having at least a right-hand and a left-hand surface, wherein each of said surfaces of said sensor is subject to solar insolation and absorbs most of the solar insolation incident thereon from the right-hand and left-hand sides of the vehicle; and two temperature sensor elements, said sensor elements being assigned one to said left-hand and one to said right-hand surface of said sensor and being connected in a heat conducting manner to the respective surfaces of said sensor.

According to yet another aspect of the invention, there has been provided a motor vehicle comprising: an air conditioning system; and a sensor device of the foregoing type connected to the air conditioning system for controlling the operation of the system.

Other objects, features and advantages of the invention will be apparent to those skilled in the art from the detailed description of preferred embodiments that follows, when considered with the accompanying figures or drawings.

BRIEF DESCRIPTION OF THE DRAWINGS

In the following, the invention is explained in detail with reference to exemplary embodiments and by reference to the drawings, in which like numerals represent like parts.

DETAILED DESCRIPTION OF PREFERRED EMBODIMENTS

Figure 3:
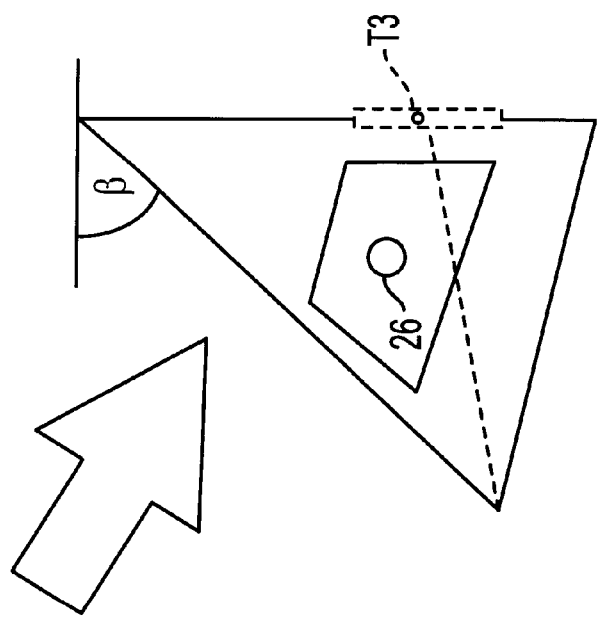
FIG. 3 shows a side view of the sensor from FIG. 1.

According to the invention, the sensor elements are designed as temperature sensors and are, in each case, connected in a heat conductive manner to their associated surfaces which absorb at least most of the solar insolation incident thereon. As a result, the direction of the solar insolation can be determined by the arrangement of the two sensor elements, namely, the solar insolation enters on one side causing a difference in temperature to be produced between the temperatures measured by the two temperature sensors. Moreover, the temperature sensors allow for the intensity of the solar insolation to be determined—at least qualitatively—because the temperature sensors measure the temperature of the surface that absorbs the solar insolation. The use of photodiodes can be eliminated and, as a result, the sensor according to the invention is much more cost effective. Also, permanent loading of the sensor according to the invention is not critical. Protective wiring for the sensor elements of the sensor according to the invention is likewise not necessary.

Measuring the temperature of a surface that absorbs at least most of the light incident thereon offers the particular advantage that this measured temperature also corresponds to the sensation of the solar insolation effect on a vehicle occupant, with the result that the measured temperature signals can be fed directly to the air conditioning control and can be evaluated in a simple manner. Accordingly, there is no need for complex control technology to differentiate, for example, between pleasantly warming winter sun and unpleasantly hot summer sun.

The surfaces are preferably blackened, and the temperature sensors are in each case mounted on their surface. For cost efficiency, the temperature sensors may, for example, be bonded on.

In one advantageous embodiment of the invention, the sensor has a third face, the surface of which is turned toward the vehicle interior and, thus, is not exposed to the solar insolation. Another temperature sensor may be arranged on the surface turned toward the vehicle interior. The third face has a reflective design so that the temperature measured by this temperature sensor is not falsified.

In a simple design refinement of the invention, the faces are arranged in the form of a three-sided pyramid.

The invention further relates to an instrument panel in which the sensor is integrated and in which the surfaces of the sensor form part of the surface of the instrument panel. In this manner, the instrument panel may have a form corresponding to that of the sensor. For example, the instrument panel may have an elevation in the form of a three-sided pyramid or a corresponding recess. The temperature sensors can be mounted on the faces of such a pyramid. The pyramid faces form part of the instrument panel. In this arrangement, any heat conductivity of the instrument panel material has to be accounted for when evaluating the temperatures measured by the individual temperature sensors.

Figure 1:
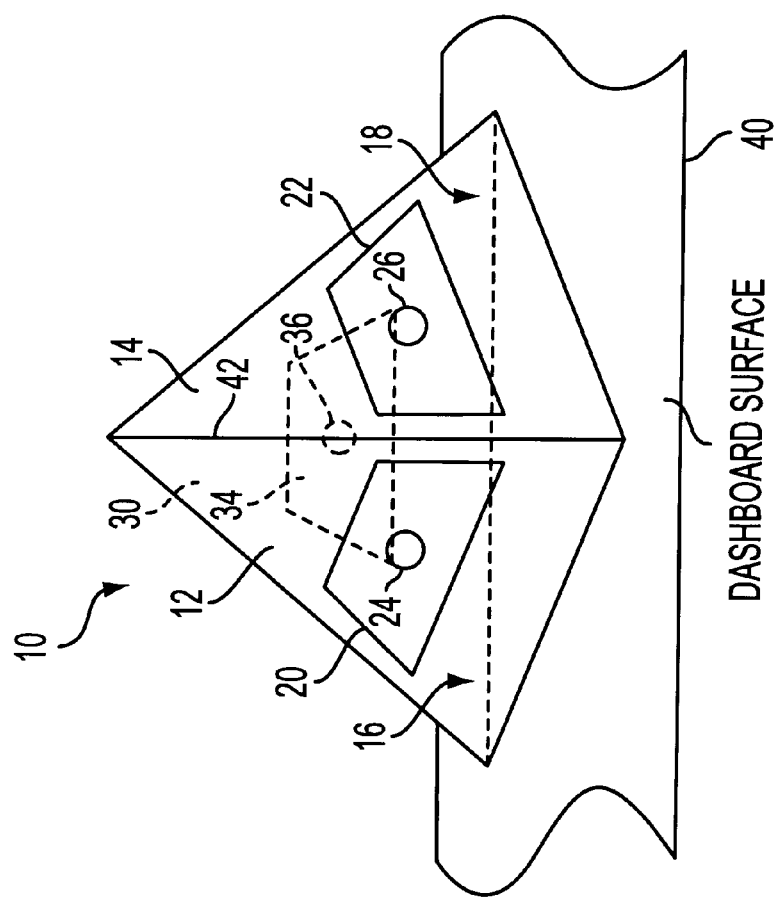
FIG. 1 shows a perspective view of a sensor according to the invention.

Turning to the drawings, a sensor 10, as shown in FIG. 1, has two faces 12 and 14 that are arranged at an angle α with respect to each other in such a manner that one face 12 is assigned to the left-hand or right-hand side of the vehicle, and the other face 14 is assigned to the other side of the vehicle. Each face 12 and 14 has a surface 16 and 18, respectively. Each of the surfaces 16 and 18 is blackened in a region 20 and 22. Temperature sensors 24 and 26 are arranged in the blackened regions 20 and 22. The temperature sensors, for example, may be bonded to their respective surfaces or fastened in any suitable manner. On one side of the sensor 10, which is turned toward the vehicle interior, a third face 30 having a surface 32 is provided, which face is, preferably, reflective in one region 34 and has a temperature sensor 36 in this reflective region 34.

The three faces 12, 14, and 30, preferably, are arranged in the form of a three sided pyramid in such a manner that the third face 30 is turned toward the vehicle interior and the first and second faces 12 and 14 are subject to the incident solar insolation, e.g., solar insolation penetrating through the vehicle windshield.

The sensor 10 according to the invention may be arranged in any position where it is suitably exposed to incident solar radiation. In one embodiment, for example, it can be positioned on a motor vehicle instrument panel or dashboard 40. The edge 42 that connects the sensor faces 12 and 14 is directed in the direction of vehicle travel 44. In such an arrangement of the faces 12, 14 and 30, the temperature sensor 36 is always turned toward the interior and, therefore, is not exposed to the solar insolation. This temperature sensor 36 is thus able to measure the temperature of the vehicle interior.

When solar insolation approaches the sensor from the direction identified by the arrows 46 and 48 (FIG. 2), the solar insolation is absorbed in the surface region 22, and the temperature sensor 26 measures a higher temperature than the temperature sensor 24. The approximate direction of the solar insolation can be determined as a result of the temperature difference between the temperatures measured by the temperature sensors 24 and 26. By comparing the temperature obtained from temperature sensor 26 versus the temperature obtained from temperature sensor 36, the intensity of the solar insolation can—at least qualitatively—be assessed. Thus, the incident solar heat, which is relevant particularly for the air conditioning of the vehicle interior, can be detemiined. Of course, the same analysis applies when solar insolation approaches from the direction indicated by arrows 50 and 52.

Alternatively, the sensor may also be arranged, for example, on a shelf adjacent the rear window of a vehicle. In this embodiment, the edge 42 is turned toward the rear of the vehicle so that the sensor can be used to measure the solar insolation entering from the left-hand or right-hand side on the vehicle from the rear. Using the signals of a sensor 10 arranged in this manner, air conditioning for the rear portion of the passenger compartment, for example, can be controlled in an improved manner. Separate sensors may be positioned adjacent both the front and rear windows of a vehicle in order to provide control for four separate areas of the passenger compartment.

Figure 2:
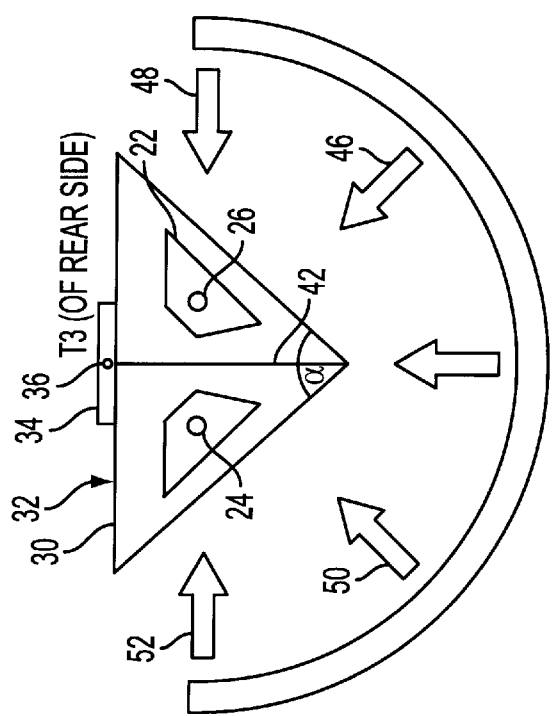
FIG. 2 shows a plan view of the sensor from FIG. 1.

In the embodiment of FIGS. 1 through 3, the sensor according to the invention is designed in as a pyramid and can be arranged as a separate component, for example, on the instrument panel or dashboard 40 or on the rear shelf in the aforementioned manner. In another embodiment of the invention, the sensor 10 is formed as an integral part of the instrument panel or dashboard 40, and the surfaces 12, 14 and 30 of the sensor 10, thus, form part of the surface of the instrument panel or dashboard. The integral arrangement results in a particularly cost effective solution, since the sensor 10 is produced without any additional outlay at the same time as the instrument panel or dashboard 40 is produced.

Figure 6:
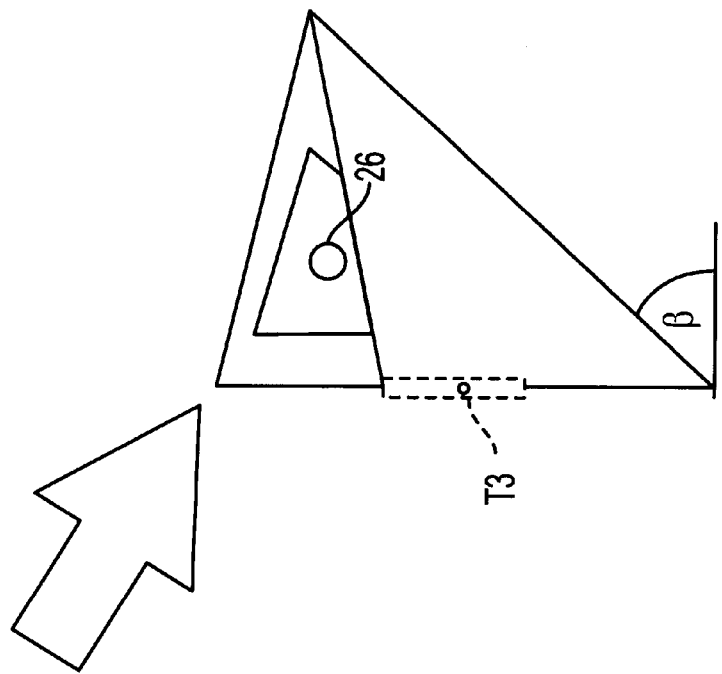
FIG. 6 shows a side view of the second exemplary embodiment.
Figure 4:
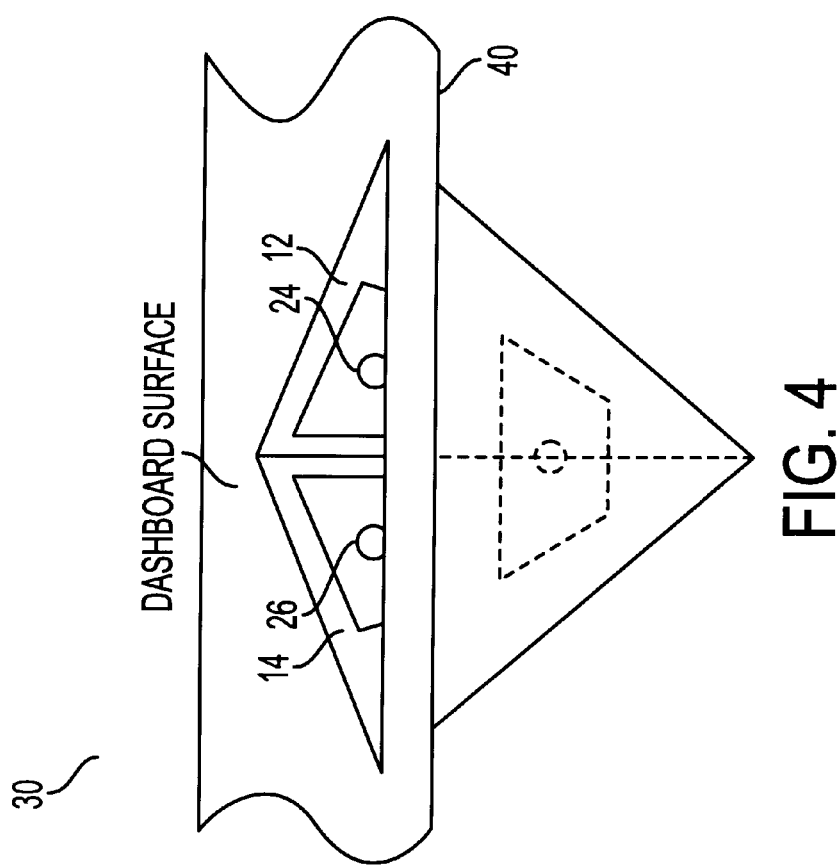
FIGS. 4 and 5 show representations similar to FIGS. 1 and 2 of a second exemplary embodiment.
Figure 5:
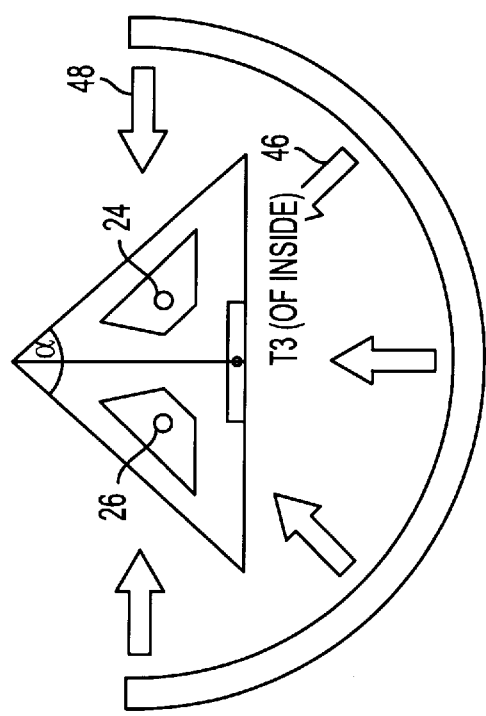

In a second embodiment represented in FIGS. 4 to 6, the sensor is of a concave design. In comparison to the embodiment of FIGS. 1 to 3, the sensor is indented by a certain amount into the instrument panel 40 and is rotated through 180°. The faces 12, 14 and 30 then form a pyramid shaped depression in the instrument panel. In this embodiment, the third temperature sensor 36 is turned toward the vehicle interior and, therefore, is not subject to the solar insolation. The temperature sensor 26 on the face 14, in turn, is subject to solar insolation entering from the directions 46 and 48 into the sensor, i.e., into the pyramid-shaped depression, as is represented in FIGS. 5 and 6. Of course, the same applies for the temperature sensor 24.

This embodiment of the sensor 10 has the advantage that the sensor 10 does not protrude beyond the instrument panel or dashboard 40 and thus does not, for example, hinder the driver's view. Moreover, there are no limitations with regard to using the instrument panel or dashboard 40, for example, as a shelf.

Other embodiments of the invention will be apparent to those skilled in the art from consideration of the specification and practice of the invention disclosed herein. It is intended that the specification be considered as exemplary only, with the true scope and spirit of the invention being indicated by the following claims.

Priority application German 19753884.3, filed Dec. 5, 1997, is hereby incorporated by reference, in its entirety.

What is claimed is:

1. A device for detecting the direction and intensity of solar insolation incident upon the interior of a vehicle, comprising:

a sensor having at least a right-hand and a left-hand surface, wherein each of said surfaces is subject to solar insolation and absorbs most of the solar insolation incident thereon from the right-hand and left-hand sides of the vehicle wherein said sensor further comprises a third surface and wherein said surfaces form a three sided pyramid; and two temperature sensor elements, said sensor elements being assigned one to said left-hand surface and one to said right-hand surface and being connected in a heat conducting manner to the respective surfaces of said sensor.

2. A device for detecting the direction and intensity of solar insolation as claimed in claim 1, wherein each of said sensor elements is bonded to the respective surfaces of said sensor.

3. A device for detecting the direction and intensity of solar insolation as claimed in claim 1, wherein each of said surfaces absorbs essentially all of the solar insolation incident thereon.

4. A device for detecting the direction and intensity of solar insolation as claimed in claim 1, wherein a region of each of said surfaces is blackened.

5. A device for detecting the direction and intensity of solar insolation as claimed in claim 4, wherein each of said temperature sensors is mounted on the associated blackened region.

6. A device for detecting the direction and intensity of solar insolation as claimed in claim 1, wherein said third surface is turned toward the vehicle interior and is not exposed to the solar insolation.

7. A device for detecting the direction and intensity of solar insolation as claimed in claim 6, further comprising a third temperature sensor, said third temperature sensor being connected in a heat conducting manner to said third surface.

8. A device for detecting the direction and intensity of solar insolation as claimed in claim 7, wherein the third surface is reflective.

9. A surface in a motor vehicle having a device for detecting the direction and intensity of solar insolation incident upon the interior of a vehicle, wherein the device forms an integral part of the surface in the motor vehicle and wherein the device comprises a sensor having at least a right-hand and a left-hand surface, wherein each of said surfaces is subject to solar insolation and absorbs most of the solar insolation incident thereon from the right-hand and left-hand sides of the vehicle; and two temperature sensor elements, said sensor elements being assigned one to said left-hand and one to said right-hand surface of said sensor and being connected in a heat conducting manner to the respective surfaces of said sensor.

10. A surface in a motor vehicle having a device for detecting the direction and intensity of solar insolation as claimed in claim 9, wherein the sensor has a third surface and wherein said third surface of said sensor is turned toward the vehicle interior and is not exposed to the solar insolation.

11. A surface in a motor vehicle having a device for detecting the direction and intensity of solar insolation as claimed in claim 10, further comprising a third temperature sensor, said third temperature sensor being connected in a heat conducting manner to said third surface of said sensor.

12. A surface in a motor vehicle having a device for detecting the direction and intensity of solar insolation as claimed in claim 11, wherein the third surface of said sensor 4s reflective.

13. A surface in a motor vehicle having a device for detecting the direction and intensity of solar insolation as claimed in claim 9, wherein the device protrudes out of the surface in the motor vehicle.

14. A surface in a motor vehicle having a device for detecting the direction and intensity of solar insolation as claimed in claim 13, wherein an edge between said left-hand and right-hand surfaces points toward a front of the motor vehicle instrument panel.

15. A surface in a motor vehicle having a device for detecting the direction and intensity of solar insolation as claimed in claim 9, wherein the device is recessed in the surface of the motor vehicle.

16. A surface in a motor vehicle having a device for detecting the direction and intensity of solar insolation as claimed in claim 15, wherein an edge between said left-hand and right-hand surfaces points toward a rear of the motor vehicle instrument panel.

17. A motor vehicle, comprising:

an air conditioning system; and a device connected to said air conditioning system for detecting the direction and intensity of solar insolation incident upon the interior of a vehicle, wherein the device forms an integral part of the surface in the motor vehicle and wherein said device comprises a sensor having at least a right-hand and a left-hand surface, wherein each of said surfaces is subject to solar insolation and absorbs most of the solar insolation incident thereon from the right-hand and left-hand sides of the vehicle; and two temperature sensor elements, said sensor elements being assigned one to said left-hand surface and one to said right-hand surface and being connected in a heat conducting manner to the respective surfaces of said sensor.

18. A surface in a motor vehicle having a device for detecting the direction and intensity of solar insolation incident upon the interior of a vehicle, wherein the device forms an integral part of the surface in the motor vehicle and comprises a sensor having at least a right-hand and a left-hand surface, the device protrudes out of the surface in the motor vehicle and an edge between said left-hand and right-hand surfaces points toward a front of the motor vehicle instrument panel.

19. A surface in a motor vehicle having a device for detecting the direction and intensity of solar insolation incident upon the interior of a vehicle, wherein the device forms an integral part of the surface in the motor vehicle comprises a sensor having at least a right-hand and a left-hand surface, wherein the device is recessed in the surface of the motor vehicle, and wherein an edge between said left-hand and right-hand surfaces points toward a rear of the motor vehicle instrument panel.

* * * * *